Aug. 25, 1964        T. MILLER        3,146,441

NAVIGATIONAL AND RECONNAISSANCE PULSE-ECHO RADAR SYSTEM

Filed Oct. 30, 1958        2 Sheets-Sheet 2

THEODORE MILLER
INVENTOR.

BY

ATTORNEY

3,146,441
NAVIGATIONAL AND RECONNAISSANCE PULSE-ECHO RADAR SYSTEM
Theodore Miller, Los Angeles, Calif., assignor, by mesne assignments, to Space Technology Laboratories, Inc., El Segundo, Calif., a corporation of Delaware
Filed Oct. 30, 1958, Ser. No. 770,721
11 Claims. (Cl. 343—5)

The present invention relates to data display systems of the type wherein data is received from a continual low speed source and displayed at a rate many times faster to obtain a non-flickering high resolution image and more particularly to a raster type display arrangement for a radio locator system using a rectangular coordinate type, high definition antenna.

In past radar navigation systems, planned position indicator type display tubes have been employed. In such a system the data writing beam is placed on a polar coordinate tube with each successive line radiating from the center of the tube whereby a complete pattern or picture is formed by a plurality of narrow radial lines tangentially spaced similar to a multispoke wheel. As is well known in this art, each line represents a narrow reflection picture of the ground sensed by a high frequency pulse transmitted in a radar beam having a width on the order of 2°, with the aircraft at the origin of the beam and represented at the center of the display tube. Moreover, the data for the radio reflection beam must be obtained from a transmitter receiver system provided with a rotable antenna capable of scanning a relatively large segment of the local terrain.

In order to obtain increased accuracy of the data provided by the radar system, it is the present practice to use high definition radar beams producible by a sharp focusing of a relatively long antenna. It is common to have such high definition antennas of a length of 15 or 20 feet. Obviously it is impracticable, even in the largest aircraft, to attempt to rotate such a long antenna for scanning purposes. Even those unfamiliar with radar will recognize that such a rotational system would require adidtional weight in the aircraft and special devices for transporting the radar signal to and from such a rotatable scanning antenna. Therefore it has been the practice to mount such a long, high definitive antenna in fixed relation to the aircraft and permit the forward motion of the aircraft to effectuate the required scanning action in traversing the ground below it.

On the other hand obtaining up-to-date information by the use of a high definition antenna secured to the craft is complicated because of the problem of properly displaying the beam data. For instance, as the aircraft traverses the ground, useful data may be obtainable each 100 feet by radiating at one side of the aircraft a reflectable magnetic beam extending three miles in a direction transverse to a line coincident with the heading of the aircraft and only 100 feet long as measured along this heading. In order to obtain a useful picture of ground terrain it is necessary to display a plurality of these data beams adjacent to each other on the face of a display tube or the like. Thus the first data beam may be placed at the bottom of the display tube with the next data beam recorded above the first and so on until the entire display tube is filled with a "complete" picture, representing by way of example, ground and terrain three miles in width and five miles in length. At this time the display is complete enough to be most useful. Once the tube raster is filled, a problem arises when it is attempted to place additional more current data on the display tube adjacent to the most recently recorded line while, at the same time, maintaining a "complete" and useful picture which can be continuously studied by the eye.

Because of present display tube characteristics, another problem in this type of display system is to obtain a high resolution image on a picture tube capable of maintaining an image for a period, such as 20 seconds, which is long enough to record 300 data beams.

Therefore an object of the present invention is to provide a simple and reliable arrangement capable of displaying the most current data in a useful non-fading rectangular high resolution display when the data is supplied, line by line, from a relatively low speed source which is continual.

A further object is to provide a radar display system wherein the information is stored at a rate proportional to the ground speed of an aircraft and may be selectively and repeatedly scanned and displayed at a much greater rate to show a current high resolution picture of a useful area.

A further object is to provide a non-fading radar display system wherein a current display of a rectangular coordinate high definition antenna is obtainable.

Briefly in accordance with one aspect of the present invention the signals from the radar receiver are conducted to an electronic storage tube and there recorded point by point on a high definition surface with each line on the surface corresponding to one radar transmitted signal and its associated returns and having a length proportional to a mile or more of the ground beside the aircraft. A second line of data is placed adjacent to the first line; this process continuing until a plurality such as 600 lines of data are permanently recorded on the surface. Depending on the speed of the craft and the particular radar arrangement this 600 lines may be recorded during a forty-second period to provide data representing an area of three miles wide by ten miles long. At the same time the information is being placed on the recording surface, a reading beam within the electronic tube is rapidly scanning the information thereon at a rate such as thirty frames per second to provide a signal for displaying the information on a high resolution rectangular raster of a display tube similar to a high resolution television display tube. The most recently recorded information is placed at the top of the display raster at or adjacent to a cordinate point recorded on the surface of the tube and indicating the position of the craft. Usually five miles of information will be sufficient for navigational or other purposes so that as soon as 600 lines have been recorded some portion of the first 300 may be obliterated without affecting the useful information. Therefore, it is contemplated that only the most recent 300 lines of information will be placed on the raster of the display tube.

The present invention, both as to organization and method of operation, together with other objects and advantages thereof will best be understood by reference to the following detailed description taken in connection with the accompanying drawings, in which.

Figure 1:
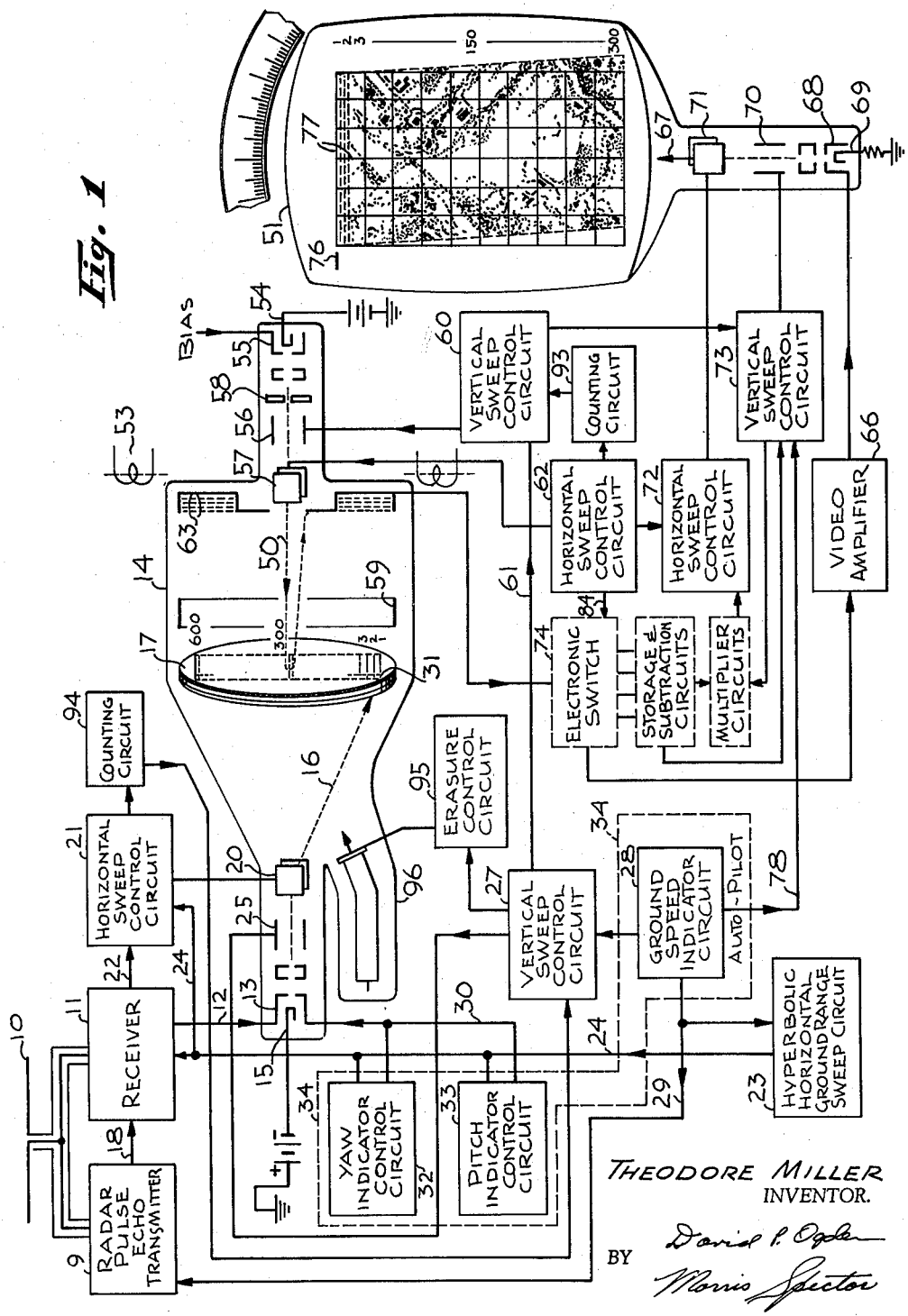
FIG. 1 is a simplified block diagram illustrative of the present invention.

For purposes of illustration the present invention will be described in some detail as it may be applied to a navigational radar system suitable for use by aircraft. Of course, this invention would be suitable for use with various other craft or elsewhere.

In the drawings, wherein like numbers refer to identical parts, there is shown a radar pulse-echo transmitter 9 which provides energy to a transmitting and receiving antenna 10 which is non-rotatably mounted in or parallel to the fuselage of the aircraft. Upon striking an object, a portion of the energy of the transmitted pulse is reflected to the antenna 10 in a manner dependent on the character of the reflecting terrain and is conducted electrically to a receiver 11 for providing a data signal 12 to modulate a current flow of a high electron velocity electron gun by modulating the voltage of a control grid 13 of a recording or storage type electronic tube 14. Usually the receiver 11 is connected electrically to the transmitter 9 to receive a synchronizing signal 18, which will allow the receiver to be receptive to reflected signals but prevent reception of the transmitter pulses.

In some respects the recording portion of the tube 14 functions much like an optical portion of a television camera tube with the image on the tube raster according to the invention being stored on a mosaiclike surface in response to the electron signal sensed thereby. A cathode 15 is biased to some negative value, such as 2000 volts, to provide a high velocity electron writing beam 16 which impinges on an erasable but otherwise substantially permanent recording media of a surface 17 to provide a substantially complete picture of the traversed terrain in a high resolution point by point record of the data signals 12.

In order that a plurality of point by point bursts of reflected information received may be recorded line by line on the surface 17, the writing beam 16 is deflected horizontally by a pair of deflection plates 20 which are energized by a horizontal sweep control 21. As is well known in the radar art a synchronizing signal 22 may be provided from the receiver 11 to properly position horizontally the writing beam 16 by controlling the horizontal sweep circuit 21. Moreover, a gate signal may be initiated at the start of the signal 22 to raise the voltage of the grid 13 to slightly above the threshold of the tube 14 conductance and thus allow recording of all useful data. Usually in a navigational radar system, the time duration of one horizontal sweep will be proportional to the ground width of the data desired and will depend to some extent on the altitude of the craft as well as the shape and strength of the radiation pattern. Generally speaking, when using the present invention to record radar navigational data it will be desirable to have a display representing an area several miles wide and the horizontal sweep should be of sufficient microsecond duration, such as twenty microseconds, to record such a length of data. After the first line of information has been recorded, the horizontal sweep voltage is returned to its original magnitude in preparation for a second line of data which may be received in one-twentieth of a second later.

In a manner well known in this art, a hyperbolic ground range control 23 will provide a synchronizing signal 24 for controlling time of energization of the receiver 11 to obtain the desired range and will additionally compensate for variations in distance between the antenna and the ground in accordance with the craft's altitude and pitch. Also the hyperbolic ground range signal 24 may be caused to control the shape of the horizontal sweep to provide a record on the surface 17, which is directly proportional to the distance, point by point, of the terrain to be viewed instead of being proportional to the time of receipt of the information. In other words, in an aircraft, since the radar antenna may be at an altitude such as one mile, a signal reflected from directly beneath the plane will be received in slightly more than 12 microseconds and one from three miles to the one side will require about 27 microseconds longer. On the other hand, if the antenna is at an altitude of approximately 4 miles, the first useful information will be received 50 microseconds after the pulse is transmitted, and the useful data burst will last only about 12 microseconds.

Because of the difficulties involved in maintaining precise tracking of the reading and writing beams, it is preferred that the entire mosaic surface be provided with data. In other words the vertical spacing is such that there is substantially no space vertically between the lines of data. In this way be reading beam may be influenced by the recorded data in a manner equivalent to a light sensitive mosaic energized by an optical image. With one particular recording surface 2 inches square the mosaic is of such a magnitude that one million bits of data may be stored.

In order to provide proper vertical spacing whereby each data line may be recorded separately, there is provided a pair of vertical deflection plates 25 which are energized by a vertical sweep control circuit 27 which will provide a sawtooth voltage having a slope dependent on the size of the mosaic particles and the frequency of the data bursts. With the mosaic referred to above, the vertical sweep need be only two thousandths of an inch per data burst. It is preferred to have the vertical sweep control 27 varied in proportion to the rate at which bursts of data are being generated, which in this case will be proportional to the ground speed of the aircraft, to provide a recorded signal of a given number of lines of data per inch of the recording surface depending on the resolution of the surface 17. This type of synchronizing is usually provided from a ground speed indicator circuit 28, which circuit may be a portion of an automatic pilot 34. When an aircraft is traversing 1500 feet per second it is feasible to provide fifteen lines of data per second, by providing an appropriate signal 29 to cause a proper number of pulses to be emitted from the transmitter 9 and a proper voltage variation on the vertical deflection plates 25. Also the signal 29 should be effective to control the reception of the receiver 11 in accordance with the transmitted pulses. Therefore the signal 29 is shown as connected to the hyperbolic horizontal ground range circuit 23.

As mentioned above, it is impractical to rotate a long high definition antenna relative to the fuselage of an aircraft to allow use of a planned position display having polar coordinates. Similarly, although it is a relatively simple matter to correct for roll of the craft, it is impracticable to add sufficient mechanical devices to correct the position of the antenna relative to the fuselage for any yaw or pitch of the aircraft. However, it is desirable to provide a picture of the data received which is not skewed, i.e., a true picture of the traversed territory which will be comparable to a given section of a reference navigational map. It has been found that according to the present invention, any such yaw or pitch may be compensated for in the display raster by electron sensing devices and control signals.

Therefore, in addition to the vertical sweep 27 and the horizontal sweep 21 which control the instantaneous location of the beam recorded on a given raster of the surface 17, and the receiver signal 12 which provides the data to be recorded, it may be desirable to provide additional coding signals to correct for any pitch (angle of climb or descent) of the craft or any yaw or drift caused by slip or crosswinds. Such signals 30 may be recorded at 31 directly on one edge of the surface 17, such as the leading edge, by providing voltage variations of the grid 13 according to signals from a yaw indicator control 32 and a pitch indicator control 33. These corrective signals may be recorded on the surface 17 after a previous data signal has been terminated.

Usually the yaw and pitch indicator signals will be obtainable directly from circuits synchronized with a portion of an automatic pilot control 34 which will normally be energized during long range flights. The operation and function of the signals 30 will be described in detail below in connection with FIG. 2.

At the same time the data is being permanently recorded on the surface 17, a low electron velocity electron scanning or reading beam 50 in the tube 14 is traversing the surface 17 containing recorded data to provide a signal for a display tube 51 which may be viewed by interested personnel to study the terrain traversed as recorded on the surface 17. In a manner well known in the art, and particularly in an image orthicon television tube type reading system, the reading beam may be focused by a focusing coil 53 after leaving the region of a low-voltage electron gun having a cathode 54, a biasing grid 55, vertical deflection plates 56 and horizontal deflection plates 57. A low-voltage or low-electron velocity reading beam adapted to provide a point by point data signal is obtainable by providing an accelerating electrode 58 which is connected to a voltage source to provide an accelerating potential several hundred volts higher than the voltage at the grid 55 and a decelerating ring electrode 59 which is connected to a voltage source only a few volts greater than that of the grid 55.

According to the present invention, in order that the low-electron velocity reading beam 50 first senses the charges in the region of the line of data last recorded by the writing beam 16, it is desirable to synchronize the voltage of the scanning deflection plates 56 with the recording vertical deflection plate voltage. Therefore the vertical sweep 60 controlling the potential of the vertical deflection plates 56 should be connected to sense a synchronizing signal 61 from the vertical sweep 27 to start at the last line recorded. If in some applications of the present invention, it proves particularly difficult to maintain precise enough synchronizing, the initial setting of the scanning beam could be placed above the recorded data and allowed to drift down until data is detected, at which time scanning is commenced. With the beam located horizontally over the reference signal 30a, as discussed below, the drifting beam would be certain to encounter data of the most recent line. Such drift might require one or two microseconds.

In the scanning portion of the tube 14 it will usually be preferable to scan approximately 30 frames a second to provide a non-flickering high resolution display on one particular type of display tube 51. Thus the sawtooth waveshape of the vertical sweep 60 is of considerably higher frequency than the recording frequency sawtooth waveshape. However, since there need be no relatively long delay between horizontal sweeps of the reading beam as compared to the writing beam, the horizontal reading sweep voltage slope provided by the horizontal sweep control circuit 62 may be comparable to that of the twenty microsecond writing beam sweep.

In one type of recording tube 14 the high electron velocity writing beam 16 displaces electrons on one side of the surface 17 to cause physically minute capacitance charges on the mosaic recording surface. The vertical spacing of the writing beam is such that the writing beam impinges on substantially every part of the surface with the intensity of the beam controlling the charge of the mosaic part affected. The low electron velocity reading beam 50, being directed at the other side of the surface 17, is disturbed by these charges as it would be by charges created by an optically produced image and is reflected because of the relative charges on the elements of the image orthicon type tube to provide a signal output on a sensing electrode such as an electron multiplier 63. The data portion of the signal 64 created within the electron multiplier 63 by the scanning beam 50 is connected to and amplified by a video amplifier 66 to control the magnitude of a writing beam 67 in the display tube 51 by controlling the voltage of a control grid 68.

In the electron gun of the display tube 51, electrons are provided by a cathode 69, controlled by the grid 68 and deflected by the vertical deflection plates 70 and the horizontal deflection plates 71. Since it is desirable that the scanning rate of the reading beam 50 is identical with that of the display writing beam 67, both a horizontal sweep control 72 and a vertical sweep control 73 of the display tube 51 should be synchronized with the horizontal and vertical sweep respectively of the reading beam 50.

Also the signal 30 recorded at 31 on the surface 17 is sensed and selectively connected by an electronic commutating switch 74 into the vertical sweep 73 to control the position of the raster lines proportional to the pitch of the aircraft.

Similarly the yaw signal 30 of the plane recorded at 31 is selectively connected to modify the horizontal sweep 72 of the display device 51 to control the shape of the total picture. For instance, if a 50 mile an hour crosswind is causing an aircraft to yaw to the left the display picture should be and will be rhomboidal as indicated. Such a rhomboidal display is obtainable by varying the line to line magnitude of the horizontal sweep voltage 72 by providing a ramp voltage which varies as a function of the vertical sweep voltage 73 with the magnitude of the yaw signal controlling the magnitude of the ramp and the direction of the yaw (left or right) controlling the sign of the voltage of the ramp. One electronic multiplier arrangement capable of producing such a ramp signal utilizes a Ratheon type UK 329 electronic beam tube function multiplier in a normal manner as disclosed in brochures relating to this tube. Of course, other suitable electronic multipliers are known in the art.

With the orientation of the display of the tube 51 as shown in FIG. 1 being such that the heading of the aircraft is displayed as vertical, the line of flight may be tilted because of yaw or drift. A somewhat different yaw correction portion of the invention is discussed in more detail below in connection with FIG. 2. When there is no cross-wind or slip in the flight of the aircraft, the display raster will be rectangular and the heading and line of flight will both be vertical.

With this type of raster display it is readily apparent that the vertical and horizontal sweeps may be adjusted to allow the position of the aircraft to be permanently indicated by a fixed point 76 mounted on or in front of the display tube 51. Moreover, in a radar navigational system using the present invention it becomes practical to provide adjacent to the display raster permanent mile indications in the form of rectangular coordinate grids 77 which may be oriented to show true north. If it is desired to maintain the constant transmitter pulse frequency, automatic corrections in the radar display for variations in ground speed to control the proper vertical spacing of the display lines are obtainable by connecting a signal 78 from the ground speed indicator circuit 28 to vary slightly the slope of the vertical sweep control circuit 73.

Figure 2:
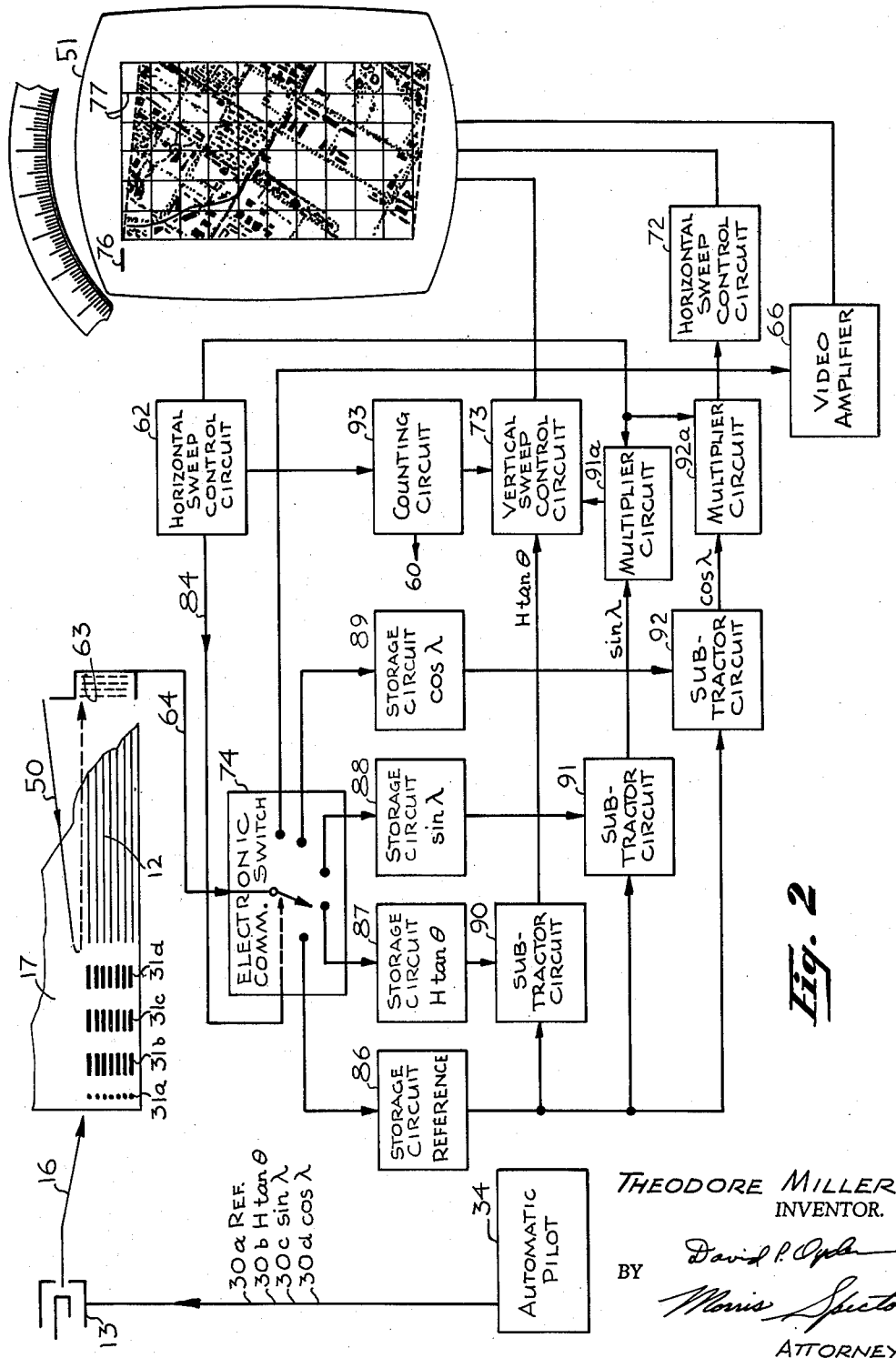
FIG. 2 is a more complete simplified block diagram of a portion of the circuit shown in FIG. 1.

Referring now to FIG. 2, I have shown an enlarged view of a portion of the recording surface 17 to illustrate one embodiment of the recorded yaw and pitch indicator signals. In this arrangement the writing beam control grid 13 is connected electrically to the automatic pilot 34 which provides a reference signal 30a, a signal 30b proportional to $H \tan \theta$ (the hyperbolic tangent of the angle of pitch) a signal 30c proportional to sine $\lambda$ (the sine of the angle of yaw) and a signal 30d proportional to cos $\lambda$ (the cosine of the angle of yaw). These signals 30a–d are readily obtainable from portions of the automatic pilot 34 which need not be discussed in detail herein. The magnitude of these signals 30a–d is recorded in a manner similar to the data signal 12 on the surface 17 at 31a, 31b, 31c and 31d respectively.

When the scanning or reading beam 50 traverses the recorded signals 30a–d, the electron multiplier 63 senses them and causes appropriate variations in the signal 64. In order to distinguish between the various signals 30a–d, the entire signal 64 is passed through an electronic commutating switch 74 which also receives a synchronizing signal 84 from the reading beam horizontal sweep circuit 62. The synchronizing signal 84 controls the circuit connections within the electronic commutating switch 74 so that the signals 30a–d are separated and placed in appropriate separate storage circuits; a reference storage circuit 86, and $H \tan \theta$ storage circuit 87, a sine $\lambda$ storage circuit 88 and a cos $\lambda$ storage circuit 89. Moreover, the electronic commutating switch 74 then connects the recorded data received from the antenna 10 to the video amplifier 66. The stored pitch and yaw signals are then compared by the subtractor circuits 90, 91 and 92 respectively, to the stored reference signal 30a to provide differential signals. The use of a reference signal will reduce error which might result from voltage variations, etc. If there is any pitch or yaw, these differential signals will control the shape of the display on the tube 51 by influencing the horizontal and vertical sawtooth waveshapes to provide a rhomboidal picture wherein the vertical or axis of the ordinates may be either the course of flight, as discussed below, or the heading of the aircraft, as discussed above in connection with FIG. 1.

Assuming the aircraft is pitched upward, as during a climbing maneuver, the most recent line of data will start in front of the aircraft location point 76. The vertical sweep is modified by the differential pitch signal $H \tan \theta$ obtained from the subtractor circuit 90 to raise the entire vertical sweep in accordance with the angle of climb. If the angle of pitch should change within the period of the recording of the data being displayed, the signal $H \tan \theta$ will vary sometimes as much as three or four degrees in one "complete" display raster. Thus during a change in pitch the spacing of the lines of the display may vary slightly.

On the other hand, assume that the course of flight is to be displayed as vertical and the aircraft is drifting or yawing to the left, the yaw angle $\lambda$ will provide a rhomboidal picture to allow the relative spacing and direction of the displayed data to be rectangular and thus proportional to a navigational map. This may be accomplished by connecting the sine $\lambda$ differential signal from the subtractor circuit 91 to the vertical sweep circuit control 73 to vary vertically the slope of the lines of data displayed. One means of accomplishing this is to provide a "ripple" type sawtooth voltage on the vertical sweep with the frequency being determined by the frequency of the horizontal sweep and the average magnitude being determined by the yaw signal. However, the point to point magnitude of the ripple frequency may be determined by both the yaw signal and the horizontal sweep signal by multiplying them in a multiplier circuit 91a which is that using the UK 329 tube discussed above. This "ripple" voltage will provide the vertical sweep with a ripple sawtooth waveshape superimposed on the vertical sweep sawtooth waveshape; in this case 300 ripples per vertical sweep are provided to vary the shape of each of the 300 lines of data per vertical sweep.

Since, in an electron display tube, each line of the display has a length equal to the vectoral sum of the vertical and horizontal sweep variation during each sweep, and since the data is derived from a source having specific dimension, it is apparent that substantial variation of the vertical sweep during each horizontal sweep will cause an increase in the length of the line of data displayed. In order to prevent such display variations despite substantial variation in the yaw angle $\lambda$, the $\cos \lambda$ signal is connected electrically from the subtractor 92 to a multiplier circuit 92a of the type described above using a UK 329 tube to provide a signal which will reduce the length of the horizontal sweep as a function of the yaw signal. This signal is then applied to the display horizontal sweep 72 to shorten the horizontal sweep sufficiently to cause the line length to remain constant despite substantial yaw.

In connection with the rhomboidal picture of the display tube 51, of FIG. 1, the vertical sweep is varied only by the pitch signal from $H \tan \theta$, and the yaw signal is converted into a ramp voltage for skewing the horizontal sweep voltage to cause the successive lines of data to be slightly displaced laterally and obtain a rhomboidal picture which is oriented vertically to show the heading of the aircraft (FIG. 1) instead of the line of flight (FIG. 2).

Obviously since the antenna is secured to the craft, the display pattern of each line is perpendicular to the heading. Similarly the line of travel should be parallel to the initiation of each line displayed. Either use, FIG. 1 or FIG. 2, of the signals 30a–d will provide a picture that has rectangular coordinates directly proportional to a navigational map and can be made to conform to rectangular coordinates affixed to or over the surface of the display tube 51.

It is within the contemplation of this invention that if data were received at a more rapid rate or if a relatively high resolution display tube were used wherein it was feasible to display the slow rate data directly, it is possible to correct for yaw or skew with a display system wherein each line of data, as received, is placed directly on a display raster. In such a case it would be a relatively simple matter to obtain the yaw and pitch data from the automatic pilot 34 and connect it directly to the sweep circuits of the display raster. However, according to the present invention, when utilizing a recording surface 17 to collect data for display, it is preferred to record the yaw and pitch signals so that any change within a "complete" picture may be shown.

While the surface 17 provides a permanent record of the data recorded thereon by the beam 16, it becomes obvious that a method of neutralizing or erasing obsolete data should be provided. Since, in the particular embodiment discussed, the scanning or reading beam 50 traverses and obtains information from no more than half of the total lines recorded, it becomes a relatively simple matter to effectively divide the recording surface 17 into two or more sections so that an obsolete section may be erased at any time the scanning beam reads 300 lines of more recent data. In other words, when the recording beam places information on line 599 or line 600, it is now practical to erase lines 1 through 300 without destroying any currently useful information. Thus a signal from a counting circuit 93 is connected to limit the vertical sweeps 60 and 73 in accordance with the characteristics of the display tube 51 without regard to the number of lines recorded. Usually this limit will be only a fraction of the total recorded data. According to my invention a similar counting circuit 94 is provided to provide a trigger pulse for initiating an erasure control circuit 95 (FIG. 1) and thus energize a low electron velocity electron gun 96 which will supply electrons for neutralizing the recorded charge to erase the obsolete data from a portion of the surface 17 to receive more recent data.

Obviously when recording data by the writing beam 16 on the surface 17 in line sequence on (for example) lines 1 through 100, with the most recent data being on line 100, it is desirable to simultaneously maintain a complete display on the 300 line raster of tube 51. In order to do this, it is necessary for the reading beam 50 to scan 300 lines of the recorded data previously written on the surface 17. Since the most recent data is recorded on lines 1 through 100 a synchronizing signal on circuit 61 will start vertical sweep control of the reading beam 50, at some position such as the most recently recorded full line on surface 17 behind the data then in the process of being recorded. If we assume, for example, the latest fully recorded line is the line 99 the line then in the process of being recorded is line 100. The reading beam 50 will then start at the line 99, trace each successive lower numbered line down to the line 1 and shift, in response to the counting circuits 93 and 94, vertically to a point where the beam 50 will continue its reading of successive liner starting at line 600 and reading down to line 399, to obtain a full raster of 300 lines of display for the tube 51. When the writing gun beam 16 completes line 100 and moves to write on line 101, in response to the vertical sweep circuit 27, the reading beam 50 is moved to start its reading at line 100 and thereafter read to line 1, shift to line 600 and read down to line 400 for the new display on tube 51. This action is continued so that the display moves in step with the ground velocity of the vehicle. In order to record new information on the area of the surface 17 lying above the line 100 and below line 399, it is necessary to erase the old information previously recorded in this area. For this purpose the erase gun 96 is provided. The erase gun 96 is a relatively broad beam electron gun having deflection plates for directing its beam. Operation of the erase gun is controlled by an erasure control circuit 95 which may be conveniently controlled by the vertical sweep control circuit 27, for causing the erase gun to erase in an area ahead of the writing beam 16. In this illustration, for example, with the erasing action provided in sequence with the writing beam 16, it may be controlled to erase at any line position between the writing line 100 and the last read line 399. For example the erase control can be established to erase lines in the vicinity of line 200 and progressed to cover line 201 when the writing beam moves to line 101 and so on. It should be clear that all old storage on the surface 17 will in this example always be eliminated 100 lines ahead of the writing beam 16. It can be seen, therefore, that as the vertical sweep 27 moves the writing beam 16 progressively upwardly writing along successive lines, the erase beam is controlled to be moved in front of and in step therewith and the read beam is controlled to rapidly cover the latest recorded lines for a set number of lines behind the writing gun beam 16.

In the control of the rapidly moving reading beam 50 the rapid change of the vertical sweep 60, of the reading beam 50, is on the same order of magnitude as the return horizontal sweep 62 so that both deflection systems of the reading beam should be of the rapid response type. If the vertical sweep 60 of the reading beam 50 reaches the proper voltage at the same time as the horizontal sweep 62 returns to its initial setting, there need be no adjustment of the display vertical sweep 73 for the reading of data at both ends of the surface 17 compared to the reading of data in a central portion. If, on the other hand, the vertical sweep 60 is slightly slower than the horizontal sweep 62, a blanking of perhaps one line should be provided in both the horizontal reading and display beams and a delay of a comparable period should be provided in the vertical sweep 73 of the display beam.

Another means of accomplishing proper scanning would be, if it is desired to study a specific area, to maintain for several seconds a selected number of display lines on the raster of the tube 51 by providing a locking voltage to prevent temporarily any variation of the signal 61.

While there has been shown and described one embodiment of the present invention, other modifications may occur to those skilled in the art. For instance, it may be desirable to erase only one-third of the recording surface 17 at a time, or it may be desirable to simplify the erasing procedure by providing two or more recording drums while using the same scanning procedure and an electronic computer switch to connect the reading beam signal 64 from one to another recording surface and thus provide a complete and current display at all times. Moreover it would be a simple matter using the present invention to provide a storage surface large enough to record data from two coordinated sources such as a left and a right antenna of an aircraft connected to control the intensity of two writing beams with a single scanning beam traversing the entire data surface. Therefore it is intended by the appended claims to cover all such modifications as fall within the true spirit and scope of the invention.

The embodiments of the invention in which an exclusive property or privilege is claimed are defined as follows:

1. A data display system adapted to display a high resolution picture at a relatively rapid frame rate using data bursts continually received at a relatively lower rate comprising: a continual signal burst producing device, a high resolution storage surface capable of receiving and recording a plurality of point by point lines of data as received from the signal producing device, scanning means associated with said signal producing device for writing said signal bursts upon said storage surface in a first preselected pattern at a first preselected rate, means for sensing point by point a plurality of any lines of data that may be stored on the surface to sense said lines in a second preselected pattern at a second preselected rate, a high resolution display device operably connected to the sensing means for displaying the plurality of lines of data sensed, and an electric circuit connection between the continual signal producing device and the sensing device for synchronizing said first preselected pattern with said second preselected pattern to sense the most recently recorded lines of data.

2. A data display system adapted to provide a high resolution display at a relatively rapid frame rate using data continually received at a relatively lower rate wherein the data receiving rate is so low as to be subject to fading considerations on a high resolution display tube, because of the period of time necessary to receive sufficiently large number of data lines to form a useful picture of the data, compared to the ability of the display tube to retain the data in a clear image, comprising: a continual signal burst producing device; an electronic storage tube containing a high resolution storage surface capable of receiving point by point data from a modulated high electron velocity electron writing beam and capable of recording a plurality of lines of data as received from the signal producing device; scanning means associated with said continual signal burst producing device and said electronic storage tube for writing said high electron velocity electron writing beam upon said storage surface at a first predetermined rate in a first predetermined pattern; a first electron gun within the storage tube for providing an electron beam to scan, point by point, a plurality of the lines of data stored on the surface without substantially disturbing the stored data, at a second predetermined rate and in a second predetermined pattern; a sensing device for providing a signal produced by the scanning beam in accordance with the lines of data recorded; a high resolution display tube having a second electron gun operably coupled to the sensing device for providing an electron beam which will cause the display within a raster of a plurality of lines of data sensed; an electric counter device for counting the number of lines displayed and terminating a vertical sweep of the display beam after a preselected number of lines have been scanned, said preselected number being on the order of one-half of the number of lines recorded, an electric circuit connection between the continual signal burst producing device and the sensing device for synchronizing said first predetermined pattern with said second predetermined pattern to permit the scanning beam to engage the most recently recorded lines of data, and a low electron velocity electron gun positioned to cause a flow of electrons which will neutralize the data recorded on a portion of the storage surface containing obsolete information which is not scanned for display.

3. A radar system mounted on a moving craft for providing a high resolution display of the most recent data received from a high definition radar antenna non-rotatably secured to the craft with the display providing a picture of sufficient dimensions to enhance interpretation thereof comprising: an electron recording tube having a high electron velocity electron gun for providing a writing beam, a high resolution storage surface, electric circuit means for modulating the current flow of an electron writing beam in accordance with data received at the antenna, means for deflecting the writing beam to place a plurality of point by point data lines on the storage surface at a rate proportional to the receipt of information from the antenna; a high resolution electronic display tube; a low electron velocity electron gun for providing a reading electron beam which will rapidly scan, point by point, a plurality of any lines of data recorded on the storage surface without substantially varying the data recorded on the surface, thereby producing a data containing signal at a frame rate substantially greater than the rate of receipt of data, said rate depending on the retention characteristics of the display tube; electric circuit means for conducting the data containing signal from the region of the reading beam to a grid of the display tube whereby a plurality of lines of data may be displayed; and other electrical circuit means for synchronizing the reading beam with the writing beam so that the most recently recorded data will be displayed.

4. A radar system mounted on a moving craft for providing a high resolution display of the most recent data bursts received from a high definition radar antenna non-rotatably secured to the craft with the display providing a picture of sufficient dimensions to enhance interpretation thereof comprising: an electron recording tube having a high electron velocity electron gun for providing a writing beam, a high resolution storage surface, electric circuit means for modulating the current flow of an electron writing beam in accordance with data received at the antenna, means for deflecting the writing beam to place a plurality of point by point data lines thereon at a rate proportional to the receipt of information from the antenna; a high resolution electronic display tube; a low electron velocity electron gun for providing a reading electron beam which will scan, point by point, a plurality of the lines of data recorded without substantially varying the data recorded on the surface, thereby producing a data containing signal; electric circuit means for conducting the data containing signal from the region of the reading beam to a grid of the display tube whereby a plurality of lines of data may be displayed; a counter circuit for limiting the number of lines displayed in accordance to the characteristics of the display tube without regard to the amount of data recorded; other electrical circuit means for synchronizing the reading beam with the writing beam so that the most recently recorded data may be displayed and additional electric circuit means for synchronizing the reading beam and the display tube electron beam to provide data displayed in the order in which the earth is traversed by the craft.

5. A radar system mounted on a moving craft for providing a high resolution display of the most recent data received from a high definition radar antenna non-rotatably secured to the craft with the display providing a picture of sufficient dimensions to enhance interpretation thereof comprising; an electron recording tube having a high electron velocity electron gun for providing a writing beam, a high resolution storage surface, electric circuit means for modulating the current flow of an electron writing beam in accordance with data received at the antenna, means for deflecting the writing beam to place a plurality of point by point data lines on the storage surface at a rate proportional to the receipt of information from the antenna; a high resolution electronic display tube; a low electron velocity electron gun for providing a reading electron beam which will scan, point by point, a plurality of the lines of data recorded without substantially varying the data recorded on the surface, thereby producing a data containing signal, the scanning rate of the reading beam being dependent on the retentive character of the display tube; electric circuit means for conducting the data containing signal from the region of the reading beam to a grid of the display tube whereby a plurality of lines of data may be displayed; a counter circuit connected for limiting the number of lines displayed in accordance to the characteristics of the display tube without regard to the amount of data recorded; other electrical circuit means for synchronizing the reading beam with the writing beam so that the most recently recorded data may be displayed, additional electric circuit means for synchronizing the reading beam and the display tube electron beam to provide data displayed in the order in which the earth is traversed by the craft; signal producing means for providing a yaw signal proportional to the yaw of the craft, and being connected to record the yaw signal on the storage surface to be scanned by the reading beam to provide a yaw signal for modifying the sweep circuits of the display tube to produce a rhomboidal display thereon when there is a substantial yaw; and rectangular coordinates associated with the display tube surface which correspond to rectangular coordinates on a comparable map of the area traversed when the yaw corrected rhomboidal display is viewed.

6. A radar system mounted on a moving craft for providing a high resolution display of the most recent data received from a high definition radar antenna non-rotatably secured to the craft with the display providing a picture of sufficient dimensions to enhance interpretation thereof comprising: an electron recording tube having a high electron velocity electron gun for providing a writing beam, a high resolution storage surface, electric circuit means for modulating the current flow of an electron writing beam in accordance with data received at the antenna, means for deflecting the writing beam to place a plurality of point by point data lines thereon at a rate proportional to the receipt of information from the antenna; a high resolution electronic display tube having a control grid; an electron gun within the storage tube for providing a reading electron beam which will scan, point by point, a plurality of the lines of data recorded without substantially varying the data recorded on the surface, thereby producing a data containing signal; electric circuit means for conducting the data containing signal to the control grid of the display tube whereby a plurality of lines of data may be displayed; a counter circuit for limiting the number of lines displayed in accordance with the characteristics of the display tube without regard to the amount of data recorded; other electrical circuit means for synchronizing the reading beam with the writing beam so that the most recently recorded data may be displayed, additional electric circuit means for synchronizing the reading beam and the display tube electron beam to provide data displayed in the order in which the earth is traversed by the craft; first signal producing means for providing a yaw signal proportional to the yaw of the craft, and being connected to record the yaw signal on the storage surface to be sensed by the reading beam to provide a yaw signal for modifying the sweep circuits of the display tube to produce a rhomboidal display thereon when there is a substantial yaw; rectangular coordinates associated with the display tube surface which correspond to rectangular coordinates on a comparable map of the area traversed when the yaw corrected rhomboidal display is viewed; second signal producing means for providing a pitch signal in accordance with any pitch of the craft which will effect the relative area sensed, and being connected to record the pitch signal on the storage surface to be sensed by the reading beam for controlling the display relative to an indication of the location of the craft on the surface of the display tube.

7. A radar system mounted on a moving craft for providing a display of the most recent data received from a high definition radar antenna non-rotatably secured to the craft comprising: a high resolution electronic display tube; a radar receiver electrically connected between the antenna and the display tube for producing a data containing signal; electric circuit means for conducting the data containing signal to a grid of the display tube whereby a plurality of lines of data may be displayed with the data displayed in the order in which the earth is traversed by the craft; first signal producing means of the type providing a yaw signal as a function of the yaw of the craft for modifying the sweep circuits of the display tube to produce a rhomboidal display thereon when there is a substantial yaw; rectangular coordinates associated with the display tube surface which correspond to rectangular coordinates on a comparable map of the area traversed when the yaw corrected rhomboidal display is viewed; and second signal producing means of the type providing a pitch signal in accordance with any pitch of the craft which will affect the relative area sensed for controlling the display relative to an indication of the location of the craft on the surface of the display tube.

8. A pulse-echo type system mounted on a moving craft for providing a display of the most recent data received from a high definition radar antenna non-rotatably secured to the craft comprising: a high resolution electronic display tube; a radar receiver electrically connected between the antenna and the display tube for producing a data containing signal information; electric circuit means for conducting the data containing signal information to a grid of the display tube whereby a plurality of lines of data may be displayed with the data displayed in the order in which the earth is traversed by the craft; and signal producing means for providing a yaw signal as a function of the yaw of the craft for modifying the sweep circuits of the display tube to produce a rhomboidal display thereon when there is a substantial yaw.

9. In a display system, first means for accumulating an information signal representing a plurality of periodically recurrent bursts of signal information, second means associated with the first for developing a display raster comprised of a predetermined number of sequentially related adjacent display lines with the time period of each line corresponding to the time period of each of the bursts, selection means connected between the recurrent bursts and the display raster for determining a given line of display to depict information contained in a given burst of information, and synchronizing means coupled between said first means and said display raster for displaying said bursts of signal information on said display raster in the order in which the latest of said bursts of signal information are received.

10. The display system as set forth in claim 9 wherein the rate of receipt of each burst of information is of the same order as the display rate of each complete raster whereby each raster display will change by no more than one burst of data relative to the previous display.

11. In a display system, a display tube, a display means for providing a raster display for said display tube, a storage tube, a recording surface in said storage tube of an area and a resolution sufficient to store bursts of information for control of said display means, recording means in said storage tube for recording bursts of information on said recording surface at one rate, reading beam means within said storage tube for scanning a limited portion of said recorded bursts of information including only the most recent recorded information at a rate higher than said one rate, said reading beam means being coupled to said display tube and being controlled by said display means, and erase means in said storage tube for selectively erasing obsolete recorded bursts that are not scanned by said reading beam.

References Cited in the file of this patent
UNITED STATES PATENTS

| | | |
|---|---|---|
| 2,605,463 | Hirschberg et al. | July 29, 1952 |
| 2,753,552 | Hom | July 3, 1956 |
| 3,044,045 | Kemp | July 10, 1962 |